United States Patent
zur Loye et al.

(10) Patent No.: US 12,410,760 B2
(45) Date of Patent: Sep. 9, 2025

(54) CONTROL SYSTEM FOR AN INTERNAL COMBUSTION ENGINE, INTERNAL COMBUSTION ENGINE SYSTEM, AND METHOD FOR CONTROLLING INTERNAL COMBUSTION ENGINE

(71) Applicant: Cummins Power Generation Inc., Minneapolis, MN (US)

(72) Inventors: Axel O. zur Loye, Columbus, IN (US); Andrew Guy Kitchen, Daventry (GB); Jisang Sun, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/523,549

(22) Filed: Nov. 29, 2023

(65) Prior Publication Data

US 2025/0172101 A1    May 29, 2025

(51) Int. Cl.
*F02D 41/00*    (2006.01)
*F02B 47/02*    (2006.01)
(Continued)

(52) U.S. Cl.
CPC ............ *F02D 41/008* (2013.01); *F02B 47/02* (2013.01); *F02D 15/00* (2013.01); *F02D 41/005* (2013.01);
(Continued)

(58) Field of Classification Search
CPC .... F02D 35/021; F02D 35/023; F02D 35/027; F02D 41/0052; F02M 26/47
See application file for complete search history.

(56) References Cited

U.S. PATENT DOCUMENTS 5,765,532 A * 6/1998 zur Loye ............ F02D 41/1473
                                                          701/104
5,778,855 A * 7/1998 Czekala .................. F02P 17/12
                                                          123/406.47
(Continued)

FOREIGN PATENT DOCUMENTS

AT                 512253 B1      11/2013
CN             114508439 A        5/2022
WO        WO-2014/027138          2/2014

OTHER PUBLICATIONS

BorgWarner Inc. "Pressure Sensor Glow Plugs." BorgWarner. Retrieved from https://www.borgwarner.com/aftermarket/diesel-cold-start-ignition/pressure-sensor-glow-plugs (2020).
(Continued)

*Primary Examiner* — John Kwon
(74) *Attorney, Agent, or Firm* — Foley & Lardner LLP (57) ABSTRACT

A control system for an internal combustion engine includes at least one sensor configured to measure a combustion signal within at least one cylinder of a plurality of cylinders within the internal combustion engine. The combustion signal corresponds to a first combustion cycle. The control system also includes a controller operably connected to the at least one sensor. The controller is configured to receive the combustion signal from the at least one sensor and determine whether the measured combustion signal satisfies at least one condition associated with the internal combustion engine. The at least one condition corresponds to the at least one of engine misfire or delayed combustion. The controller is further configured to, based on the determination, reduce a fueling amount to the at least one cylinder for a predetermined number of combustion cycles following the first combustion cycle.

9 Claims, 5 Drawing Sheets

(51) Int. Cl.
  F02D 15/00  (2006.01)
  F02P 5/15  (2006.01)
(52) U.S. Cl.
  CPC ...... *F02P 5/1502* (2013.01); *F02D 2200/024* (2013.01); *F02D 2200/0406* (2013.01)

(56) References Cited

U.S. PATENT DOCUMENTS

| | | | |
|---|---|---|---|
| 5,955,826 | A | 9/1999 | Suzuki et al. |
| 6,204,594 | B1 | 3/2001 | Ingham |
| 7,823,562 | B2 * | 11/2010 | Duineveld ............ F02D 19/081 |
| | | | 123/198 A |
| 9,206,761 | B2 | 12/2015 | Cohn et al. |
| 9,797,327 | B2 * | 10/2017 | Glugla ................ F02D 41/1498 |
| 9,863,342 | B2 | 1/2018 | Tulapurkar et al. |
| 9,951,703 | B2 * | 4/2018 | Pathan .................... B61C 17/00 |
| 10,450,970 | B2 | 10/2019 | Huang et al. |
| 10,519,877 | B2 | 12/2019 | Stockner et al. |
| 10,760,514 | B2 * | 9/2020 | Glugla .................... F02D 15/02 |
| 10,815,919 | B2 | 10/2020 | Kolhouse et al. |
| 11,261,814 | B1 * | 3/2022 | Uphues ................... F02D 41/38 |
| 11,480,115 | B1 | 10/2022 | Svensson et al. |
| 2011/0307163 | A1 | 12/2011 | Kato et al. |
| 2013/0139786 | A1 | 6/2013 | Glugla et al. |
| 2020/0102900 | A1 | 4/2020 | Kolhouse et al. |
| 2021/0332743 | A1 | 10/2021 | Seba et al. |

OTHER PUBLICATIONS

Burke, Jack. "New Generation of IMES Cylinder Pressure Sensors." Power Progress, Oct. 6, 2020. Retrieved from https://www.powerprogress.com/news/new-generation-of-imes-cylinder-pressure-sensors/7012159.article (2020).
Cat Electric Power. "Cat® 3516B DGB (Dynamic Gas Blending™)." YouTube, Feb. 24, 2020. Retrieved from https://www.youtube.com/watch?v=NApQBInZWVE (2020).
Cat Electric Power. "Cat® Dynamic Gas Blending™ (DGB™)." YouTube, Sep. 29, 2020. Retrieved from https://www.youtube.com/watch?v=x6kasTQeYWk (2020).
Caterpillar Oil & Gas. "3512E DGB—Dynamic Gas Blending Engine." YouTube, Jun. 13, 2019. Retrieved from https://www.youtube.com/watch?v=M6EolUv9lyU (2019).
Caterpillar Oil & Gas. "Cat® 3512E Tier 4 Final DGB™ Engine: Tuned for Gas. Runs Like Diesel" YouTube, Nov. 2, 2021. Retrieved from https://www.youtube.com/watch?v=uDI6fHYIdtE (2021).
Feindt, Alexander. "H2 Technologies in Shipping Engine Concepts & FGSS/Tanks." MAN Energy Solutions, May 19, 2021. Retrieved from https://h2ports.eu/wp-content/uploads/2021/05/6.-210519-Hydrogen_Valencia-Port-Alexander-MAN.pdf (2021).
Gathmann, Moritz. "How to build a hydrogen engine." MAN Energy Solutions. Retrieved from https://www.man-es:com/discover/buildung-a-hydrogen-engine (2023).
IMES. "Cylinder Pressure Sensors." IMES. Retrieved from https://www.imes.de/htt-04.html (2015).
KHL Group. "MAN's New Gas Engine." Diesel Progress, Jan. 2022, pp. 37. Retrieved from https://digimag.powerprogress.com/magazine/january-2022 (2022).
Laiminger, Stephan et al. "Hydrogen as Future Fuel for Gas Engines." INNIO Jenbacher, 29th CIMAC Congress. Retrieved from https://www.clarke-energy.com/2019/hydrogen-future-fuel/ (2019).
Laiminger, Stephan et al. "Hydrogen as Future Fuel for Gas Engines." MTZ Worldwide, Issue May 2020. Retrieved from https://www.innio.com/en/news-media/media-center/brochures/hydrogen-as-future-fuel-for-gas-engines (2020).
Liebherr-Components AG. "Liebherr's H2 direct injection solutions for heavy-duty engines." Liebherr, Nov. 2, 2021. Retrieved from https://www.liebherr.com/en/USA/latest-news/news-pressreleases/detail/liebherr%E2%80%99s-h2-direct-injectionsolutions-for-heavy-duty-engines.html (2021).
Liebherr-Components AG. "Mahle Powertrain collaborates with Liebherr to co-develop active pre-chamber technology for heavy-duty hydrogen-fuelled engines." Liebherr, Oct. 14, 2021. Retrieved from https://www.liebherr.com/en/usa/latest-news/news-press-releases/detail/mahle-powertraincollaborates-with-liebherr-to-co-develop-active-pre-chamber-technology-for-heavy-duty-hydrogenfuelled-engines.html (2021).
MAN Engines, "MAN Hydrogen Dual Fuel Marine Engine." Man Engines. Retrieved from https://www.man.eu/engines/en/products/marine/man-dual-fuel-marine-engine.html (2022).
Munchi, Sandeep et al. "Total Cost of Ownership (TCO) Analysis for Heavy Duty Hydrogen Fueled Powertrains." Westport Fuel Systems and AVL, Feb. 25, 2021. Retrieved from https://www.avl.com/documents/10138/2703324/20201225_Westport_AVL_Whitepaper_Hydrogen_HPDI_final.pdf/3f482167-d9ee-8a00-7e3a-ceb024373fe9 (2021).
Payrhuber, Klaus. "H2 as a future fuel for CHP." INNIO Jenbacher GmbH & Co OG, Jun. 21, 2021. Retrieved from https://impact2025.nl/wp-content/uploads/2021/06/2021-06_INNIO_H2-zum-Nachdenken-NL-GHG_fs.pdf (2021).
Rank, Peter. "S4000M05-N Gas Mobile Marine Workshop on Modernisation of Danube Vessels Fleet." Gas Mobile Marine, Apr. 2018. Retrieved from https://www.scribd.com/document/470095862/20180418-12-MTU-Gas-mobile-Marine-Presentation-Danube-Vessel-Fleet-Short-Poepsel (2018).
Ritscher, Bert et al. Greve "Caterpillar M46 Dual Fuel Engine with New Cylinder Pressure Based Control Strategies", Proc. 2013 CIMAC Conference, Shanghai, Paper No. 411. Retrieved from http://huiyuan.csice.org.cn/library/meeting/paper/1609.html (2013).
Rolle, Sebastian et al. "Combustion Control and Monitoring of two-stroke engines." Wartsila Technical Journal 02.11, pp. 52-57. Retrieved from https://www.wartsila.com/docs/default-source/servicecatalogue-files/engine-services---2-stroke/combustioncontrol-and-monitoring-of-two-strokeengines114e7e4a7f0f601bb10cff00002d2314.pdf?sfvrsn=91411e45_4 (2011).
Rolls Royce Group. "Marine Gas Engine Series 4000 M05-N for vessels with unrestricted continuous operation (1A)." Edition 01/20, ESM 2020-07. Retrieved from https://www.mtu-solutions.com/content/dam/mtu/products/commercial-marine/marine-and-offshore-service-and-supply/main-propulsion/mtu-series-4000/32310441_MTU_Marine_spec_Gas_4000M05N_1A.pdf/_jcr_content/renditions/original./32310441_MTU_Marine_spec_Gas_4000M05N_1A.pdf (2020).
Schlick, Harald. "Potentials and challenges of gas and dual-fuel engines for marine application." 5th CIMAC Cascades, Oct. 23, 2014. Retrieved from https://www.cimac.com/cms/upload/events/cascades/cascades_2014_busan/presentations/Presentation_Session2_AVL_CASCADES_Busan_Oct2014_Harald_Schlick.pdf (2014).
Wartsila. "Intelligent Combustion Monitoring for Two-stroke Diesel Engines." Wartsila Engine Services. Retrieved from https://www.wartsila.com/docs/default-source/Servicecatalogue-files/Engine-Services---2-stroke/intelligentcombustion-monitoring-for-2-stroke-engines.pdf?sfvrsn=0 (2010).
Yip, Ho Lung et al. "A Review of Hydrogen Direct Injection for Internal Combustion Engines: Towards Carbon-Free Combustion." Applied Sciences. Retrieved from https://www.mdpi.com/2076-3417/9/22/4842/pdf (2019).
Extended European Search Report on EP Appl. Ser. No. 24215557.0 Dated Jul. 4, 2025 (14 pages).

* cited by examiner

CONTROL SYSTEM FOR AN INTERNAL COMBUSTION ENGINE, INTERNAL COMBUSTION ENGINE SYSTEM, AND METHOD FOR CONTROLLING INTERNAL COMBUSTION ENGINE

TECHNICAL FIELD

The present disclosure relates generally to controlling internal combustion engine systems and methods thereof.

BACKGROUND

In an internal combustion engine system including a multi-cylinder engine (e.g., compression ignition or spark ignition internal combustion engines, etc.), combustion across the cylinders of the multi-cylinder engine is an important aspect of engine performance. Abnormal combustion, which can result from fluctuations in one or more boundary conditions and/or malfunctioning of one or more components in the combustion engine system, can cause engine damage. Accordingly, efforts to prevent or predict engine pre-ignition, knock, and/or other conditions related to engine misfire can reduce the risk of engine damage and/or shutdown.

SUMMARY

One aspect of the disclosure relates to a control system for an internal combustion engine. The control system includes at least one sensor configured to measure a combustion signal within at least one cylinder of a plurality of cylinders within the internal combustion engine, the combustion signal corresponding to a first combustion cycle, and a controller operably connected to the at least one sensor. The controller is configured to receive the combustion signal from the at least one sensor, determine whether the measured combustion signal satisfies at least one condition associated with the internal combustion engine, where the at least one condition corresponding to at least one of engine misfire or delayed combustion, and based on the determination, reduce a fueling amount to the at least one cylinder for a predetermined number of combustion cycles following the first combustion cycle.

In various embodiments, the at least one sensor is a pressure sensor. In some embodiments, the combustion signal includes a ratio of pressures between a first pressure and a second pressure. In other embodiments, the first pressure corresponds to a pressure within a first cylinder of the plurality of cylinders and the second pressure corresponds to a pressure within a second cylinder of the plurality of cylinders. In yet other embodiments, the first pressure corresponds to a first crank angle in a first interval within the first combustion cycle and the second pressure corresponds to a second crank angle in a second interval within the first combustion cycle. In various embodiments, the first interval is a compression interval and the second interval is an expansion interval. In some embodiments, the first pressure corresponds to a maximum pressure of the at least one cylinder and the second pressure corresponds to a pressure at an intake manifold of the internal combustion engine. In other embodiments, the controller is further configured to adjust a second fueling amount to another cylinder of the plurality of cylinders. In various embodiments, the controller is further configured to adjust a timing of ignition corresponding to the at least one combustion cycle based on the measured combustion signal. In some embodiments, the controller is further configured to adjust a flow of exhaust gas recirculation within the internal combustion engine based on the measured combustion signal.

Another aspect of the present disclosure relates to an internal combustion engine system. The internal combustion engine system includes an internal combustion engine having a plurality of cylinders, at least one manifold structured to facilitate flow of an intake charge into and out of the plurality of cylinders, an output shaft, where the output shaft is driven by combustion of fuel supplied to each of the plurality of cylinders, and at least one sensor in communication with each of the plurality of cylinders, the at least one manifold, and the output shaft. The internal combustion engine system further includes a control system configured to control the internal combustion engine. The control system includes at least one controller configured to receive at least one combustion signal from the at least one sensor, the at least one combustion signal being associated with at least one of the plurality of cylinders, the output shaft, or the at least one manifold, and where the at least one combustion signal corresponds to at least one combustion cycle of the internal combustion engine. The at least one controller is further configured to determine at least one condition associated with the internal combustion engine, where determining the at least one condition is based on the at least one combustion signal. The combustion signal includes at least one of the following: at least one pressure within at least one cylinder of the plurality of cylinders, at least one pressure within the at least one manifold, or a rotational speed of the output shaft. The at least one controller is further configured to, based on the determination, reduce a fueling amount to the at least one cylinder of the plurality of cylinders for a predetermined number of combustion cycles following the at least one combustion cycle.

In various embodiments, the at least one combustion signal includes the rotational speed of the output shaft, where the at least one controller is further configured to: determine an amount of fluctuation in the rotational speed of the output shaft, and compare the amount of fluctuation in the rotational speed to a nominal speed fluctuation amount, and wherein determining the at least one condition is further based on the comparison between the amount of fluctuation in the speed and the nominal speed fluctuation amount. In some embodiments, the at least one combustion signal includes the at least one pressure within the at least one manifold, where the at least one controller is configured to: determine a rate of change of the at least one pressure within the at least one manifold, the at least one manifold comprising at least one of an intake manifold or an exhaust manifold, and wherein determining the at least one condition is further based on the rate of change of the at least one pressure within the at least one manifold. In other embodiments, the at least one combustion signal includes a first pressure within the at least one cylinder of the plurality of cylinders and a second pressure within the at least one cylinder of the plurality of cylinders. In yet other embodiments, the first pressure corresponds to a first angle of a crankshaft within the internal combustion engine and the second pressure corresponds to a second angle of the crankshaft within the internal combustion engine. In various embodiments, the at least one combustion cycle includes a first combustion cycle and a second combustion cycle subsequent to the first combustion cycle, and where the at least one combustion signal includes a first combustion signal corresponding to the first combustion cycle and a second combustion signal corresponding to the second combustion signal.

Yet another aspect of the present disclosure relates to a method for controlling an internal combustion engine. The method includes measuring, by a sensor of at least one cylinder within the internal combustion engine, a first combustion signal and a second combustion signal respectively corresponding to at least one first combustion cycle and at least one second combustion cycle. The method also includes determining, by a controller in communication with the sensor, at least one first condition associated with the at least one cylinder based on at least the first combustion signal and at least one second condition associated with the at least one cylinder based on at least the second combustion signal. The method further includes responsive to determining one or more of the at least one first condition or the at least one second condition, carrying out at least one mitigating action for the internal combustion engine, where the at least one mitigating action includes adjusting fuel delivery following the one or more of the at least one first combustion cycle or the at least one second combustion cycle.

In various implementations, carrying out the at least one mitigating action includes at least one of the following: adjusting a fuel delivery amount to the at least one cylinder, adjusting an ignition event within the at least one combustion cycle, adjusting an amount of air handling within the internal combustion engine, adjusting at least one valve parameter corresponding to at least one of an intake valve or an exhaust valve within the internal combustion engine, adjusting a water injection amount within the internal combustion engine, adjusting a cooling amount within the internal combustion engine, or adjusting a compression ratio associated with the at least one cylinder. In some implementations, measuring the first combustion signal and the second combustion signal includes determining that at least one of the first combustion signal or the second combustion signal includes at least one pressure within the at least one cylinder. In other implementations, measuring the first combustion signal and the second combustion signal includes determining that at least one of the first combustion signal or the second combustion signal includes a ratio of pressures between a first pressure and a second pressure, and wherein the at least one cylinder includes a first cylinder and a second cylinder, the first pressure corresponding to the first cylinder and the second pressure corresponding to the second cylinder. In yet other implementations, determining that at least one of the first combustion signal or the second combustion signal corresponds to at least one pressure includes determining that the at least one pressure includes a third pressure corresponding to a pressure during a first interval within the first combustion cycle and a fourth pressure corresponding to a pressure during a second interval within the first combustion cycle.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are contemplated and made part of this disclosure.

The present disclosure pertains at least in part to systems and methods providing for predicting and/or preventing abnormal combustion. Abnormal combustion can include, but is not limited to, pre-ignition (i.e., when fuel burns prematurely) or knock (i.e., when fuel burns too quickly). Preempting abnormal combustion during an engine cycle consequently preempts the likely detrimental effects in a subsequent engine cycle. Preventing pre-ignition, knock, and/or misfire can reduce the risk of engine damage or shutdown.

In various embodiments, such systems and methods allow for the detection of pre-ignition events to prevent subsequent detrimental pre-ignition events (i.e., in subsequent operation cycles) by implementing cylinder-specific controls in order to mitigate damage. In various embodiments, pre-ignition events can be caused by misfire in a prior engine cycle and include slow combustion (i.e., delayed combustion or combustion that is slower than is typical for a nominal combustion cycle), and/or partial combustion. Thus, detection of misfire in a first cycle can be an indicator of a likely pre-ignition event or knock in a second, subsequent cycle. For example, if a misfire occurs in the first cycle, the subsequent cycle will have more fresh charge as compared to a nominal or average fresh charge. Increased fresh charge can increase the likelihood of knock. In another example, if slow combustion is detected, a temperature of production products will be elevated because less cooling occurred during expansion. This elevated temperature can be due to reduced expansion of combustion products (i.e., as compared to expansion of combustion products during nominal combustion). Increased temperature of production products in a first cycle can indicate an increased likelihood of pre-ignition events and/or knock in a second, subsequent cycle. Similarly, in yet another example, in the case of a partial combustion event, a fraction of fresh charge is higher as compared to a nominal or average amount of fresh charge and/or a temperature of combustion products is higher as compared to a nominal or average temperature of combustion products.

Accordingly, the present disclosure outlines a system and method for measuring cylinder pressure, in isolation or together with engine speed fluctuations, to determine whether engine misfire or delayed combustion has occurred or is likely to occur and to enable one or more mitigating actions within the engine to prevent damage or shutdown.

Figure 1:
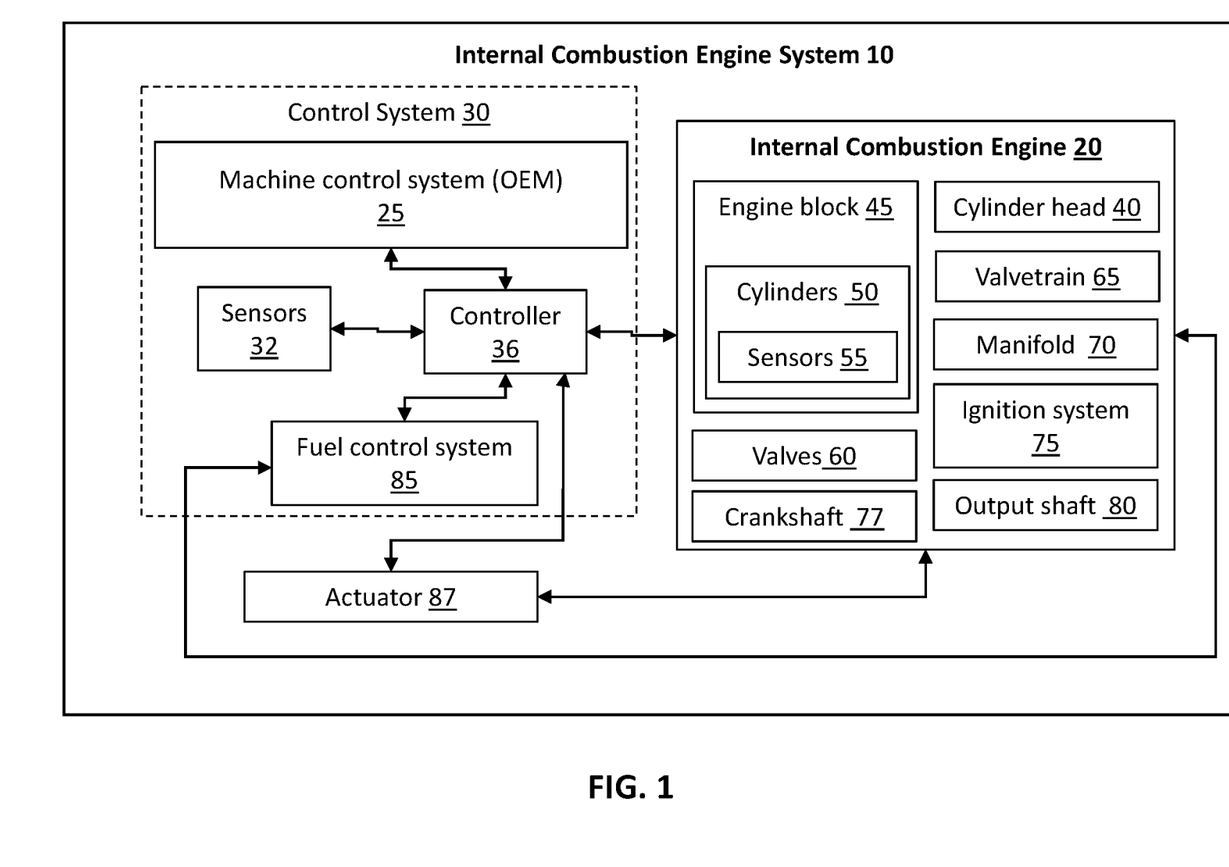
FIG. 1 is schematic representation of an engine system, according to an embodiment.

In various embodiments, a control system 30 for an internal combustion engine 20 includes at least one sensor 55 configured to measure a combustion signal within at least one cylinder 50 of a plurality of cylinders 50 within the internal combustion engine 20, the combustion signal corresponding to a first combustion cycle, and a controller 36 operably connected to the at least one sensor 55. The controller 36 is configured to: receive the combustion signal from the at least one sensor 55, determine whether the measured combustion signal satisfies at least one condition associated with the internal combustion engine 20, the at least one condition corresponding to at least one of engine misfire or delayed combustion, and based on the determination, reduce a fueling amount to the at least one cylinder 50 for a predetermined number of combustion cycles following the first combustion cycle.

Referring to FIG. 1, a block diagram of the internal combustion engine system 10 is shown. The internal combustion engine system 10 includes the internal combustion engine 20 having the plurality of cylinders 50, each of the plurality of cylinders 50 including at least one sensor 55. The internal combustion engine 10 also includes the control system 30 configured to control the plurality of cylinders 50. The control system 30 includes at least one controller 36. The at least one controller is configured receive at least one combustion signal from the at least one sensor 55, where the at least one combustion signal corresponds to at least one combustion cycle. The at least one controller is further configured to determine at least one condition associated with the at least one cylinder 50, where the at least one condition corresponds to at least one of cylinder misfire or delayed combustion, and where determining the at least one condition is based on the at least one combustion signal. The at least one controller 36 is further configured to, based on the determination, reduce a fueling amount to the at least one cylinder 50 for a predetermined number of combustion cycles following the at least one combustion cycle.

As shown in FIG. 1, the internal combustion engine system 10 includes the internal combustion engine 20, which is operably coupled to the control system 30 and at least one actuator 87. As shown, the internal combustion engine 20 is coupled to the control system 30 via the at least one controller 36. In various embodiments, the internal combustion engine system 10 can be configured for use with various fuel types, including, but not limited to, natural gas, petroleum products, ethanol, hydrogen, etc. In various embodiments, the internal combustion engine 20 can be a spark ignition engine, a dual fuel engine, a micro-pilot ignited engine, or any other engine known in the art. In some embodiments, the internal combustion engine 20 is a hydrogen fueled spark ignition engine. In other embodiments, the internal combustion engine 20 is a dual fuel engine, structured to operate using a first fuel and a second fuel. In yet other embodiments, the first fuel has a low cetane number (e.g., natural gas) and the second fuel has a comparatively high cetane number (e.g., diesel). In some embodiments, the internal combustion engine 20 is a spark ignited engine structured to operate using a low cetane number fuel (e.g., natural gas).

In various embodiments, the internal combustion engine 20 is structured to operate using a high cetane number fuel. In some embodiments, the high cetane number fuel can include, but is not limited to, diesel, gas-to-liquid (GTL) diesel, heavy fuel oil (HFO), low sulfur fuel oil (LFSO), hydrotreated vegetable oil (HVO), marine gas oil (MGO), renewable diesel, biodiesel, paraffinic diesel, dimethyl ether (DME), F-76 fuel, F-34 fuel, Jet A fuel, JP-4 fuel, JP-8 fuel, and oxymethylene ether (OME). In other embodiments, the internal combustion engine 20 is structured to additionally or alternatively operate using a low cetane number fuel. In some embodiments, the low cetane number fuel (i.e., high octane number, high methane number) can include, but is not limited to, natural gas, hydrogen, ethane, propane, butane, syngas, ammonia, methanol, ethanol, and gasoline.

The control system 30 is configured to send one or more inputs to the controller 36, where the controller 36 then controls the internal combustion engine 20. In various embodiments, the controller 36 is configured to include a processor and a non-transitory computer readable medium (e.g., a memory device) having computer-readable instructions stored thereon that, when executed by the processor, cause the at least one controller 36 to carry out one or more operations. In various embodiments, the controller 36 is a computing device (e.g., a microcomputer, microcontroller, or microprocessor). In other embodiments, the at least one controller 36 is configured as part of a data cloud computing system configured to receive commands from a user control device and/or remote computing device.

As shown in FIG. 1, the controller 36 is operably coupled to a machine control (OEM) system 25, at least one sensor 32, at least one fuel control system 85, and at least one actuator 87. In other embodiments, the controller 36 can be coupled to fewer or more components. In some embodiments, the actuator 87 is operably coupled to the internal combustion engine 20. In various embodiments, the fuel control system 85 is operably coupled to the internal combustion engine 20. In some embodiments, the fuel control system 85 is configured to control or facilitate flow of fuel into the internal combustion engine 20. The actuator 87 can include one or more fuel type actuators (e.g., gas pedal, diesel type actuator, etc.), air handling actuators, aftertreatment actuators, or any other type of actuator within the internal combustion engine system 10. Accordingly, during operation, the controller 36 can send and/or receive one or more inputs to one or more components within the internal combustion engine 20, the fuel control system 85, the at least one sensor 32, the OEM system 25, and the actuator 87.

As shown, the internal combustion engine 20 includes a cylinder head 40 and an engine block 45. As shown, the engine block 45 can include a plurality of cylinders 50, each of the plurality of cylinders 50 including at least one sensor 55. The at least one sensor 55 can be configured to sense one or more conditions associated with each corresponding cylinder 50. In various embodiments, the at least one sensor 55 can be a pressure sensor. For example, in various embodiments, the at least one sensor 55 is an in-cylinder pressure sensor (ICPS). In other embodiments, the at least one sensor 55 can be a temperature sensor. In some embodiments, the at least one sensor 55 is an ionization sensor. In other embodiments, the at least one sensor 55 is an optical sensor. In yet other embodiments, the sensor 55 can be any other sensor type known in the art.

In various embodiments, the one or more sensors 32 within the control system 30 can be operably connected to the cylinders 50 and/or the sensors 55, where the one or more sensors 32 can be configured to sense one or more conditions of one or more corresponding cylinders 50. In various embodiments, the one or more sensors 32 are configured to sense the condition associated with the one or more cylinders 50 in addition to or instead of the one or more sensors 55. In various embodiments, the one or more sensors 32 can be a pressure sensor. In other embodiments, the one or more sensors can be a temperature sensor. In yet other embodiments, the one or more sensors 32 can be any other sensor type known in the art.

The internal combustion engine 20 also includes one or more valves 60 (e.g., intake and exhaust valves). The one or move valves 60 are structured to allow or restrict flow of air and/or fuel between the cylinder head 40 and/or cylinders 50 during operation of the internal combustion engine 20. For example, the intake valve can control the flow of intake charge into the cylinders 50. In embodiments where the internal combustion engine 20 has exhaust gas recirculation (EGR), then exhaust flow can be added to air or an air-fuel mixture upstream of the intake valve. In various embodiments, the intake charge can include an air-fuel mixture, air, air and recirculated exhaust gas, or an air-fuel mixture with recirculated exhaust gas. In another example, the exhaust valve can control the flow of combustion products exiting the cylinders 50. In various embodiments, the internal combustion engine 20 can include a fuel injector to add fuel directly to the cylinders 50. In some embodiments, the internal combustion engine system 10 is structured such that fuel can be added to the engine intake before the intake charge enters the cylinders. In various embodiments, the fuel can be added using a port injector.

In various embodiments, the internal combustion engine system 10 comprises the internal combustion engine 20. The internal combustion engine 20 comprises the plurality of cylinders 50, at least one manifold 70 structured to facilitate flow of an intake charge into and out of the plurality of cylinders 50, an output shaft 80, the output shaft 80 being driven by combustion of fuel supplied to each of the plurality of cylinders 50, and at least one sensor 55 in communication with each of the plurality of cylinders 50, the at least one manifold 70, and the output shaft 80, and the control system 30 configured to control the internal combustion engine 20. The control system 30 comprises at least one controller configured to: receive at least one combustion signal from the at least one sensor 55, the at least one combustion signal being associated with at least one of the plurality of cylinders 50, the output shaft 80, or the at least one manifold 70, wherein the at least one combustion signal corresponds to at least one combustion cycle of the internal combustion engine 20; determine at least one condition associated with the internal combustion engine 20, wherein determining the at least one condition is based on the at least one combustion signal, the combustion signal comprising at least one of the following: at least one pressure within at least one cylinder 50 of the plurality of cylinders 50, at least one pressure within the at least one manifold 70, or a rotational speed of the output shaft 80; and based on the determination, reduce a fueling amount to the at least one cylinder 50 of the plurality of cylinders 50 for a predetermined number of combustion cycles following the at least one combustion cycle.

In various embodiments, the internal combustion engine 20 also includes a valvetrain 65. The valve train 65 is operably coupled to the valves 60. The valvetrain 65 controls operation of the valves 60. The internal combustion engine 20 also includes the at least one manifold 70 (e.g., intake manifold, exhaust manifold, etc.). The at least one manifold 70 can facilitate exchange of an air-fuel mixture between the cylinders 50. In some embodiments, the at least one manifold 70 is structured to facilitate flow of the intake charge into and out of the plurality of cylinders 50. For example, in various embodiments, the at least one manifold 70 includes an intake manifold and an exhaust manifold. In such embodiments, the intake manifold can supply the intake charge to the cylinders 50 and the exhaust manifold can receive or collect the exhaust gases or combustion products from the cylinders 50.

In addition, the internal combustion engine 20 can include an ignition system 75 coupled to or contained within the cylinder head 40. The ignition system 75 can facilitate ignition of the intake charge (i.e., an ignitable mixture) supplied to the cylinders 50 and cause combustion within the internal combustion engine 50. The ignition system 75 is structured to initiate combustion by igniting the ignitable mixture (i.e., flowing through the engine block 45 and the cylinder head 40). Energy from the combustion of fuel supplied to the cylinders 50 can then drive an output shaft 80 within the internal combustion engine 20 to power the internal combustion engine system 10. The internal combustion engine 20 operates during one or more consecutive combustion cycles. During the one or more consecutive combustion cycles, a piston, which is coupled to a crankshaft 77, within the internal engine passes through multiple strokes (or intervals) within the combustion cycle. In various embodiments, the crankshaft 77 is mounted within the engine block 45 and is structured to transform linear motion of the piston (coupled to the cylinders 50) into rotational motion (i.e., of the output shaft 80).

In various embodiments, the internal combustion engine 20 is a two-stroke engine, where each combustion cycle therefore includes two intervals. In other embodiments, the internal combustion engine 20 is a four-stroke engine in which each combustion cycle comprises four intervals. In embodiments, where the internal combustion engine 20 is a four-stroke engine, each combustion cycle includes four intervals corresponding to four piston strokes: an intake interval, a compression interval, a power interval, and an exhaust interval. In other embodiments, the internal combustion engine 20 can be structured to operate using more than four strokes.

In various embodiments, the controller 36 is configured to receive a combustion signal corresponding to at least one cylinder of the plurality of cylinders 50 within the internal combustion engine 20. The controller 36 can receive the combustion signal from the one or more sensors 32 and/or the one or more sensors 55, which are configured to measure one or more parameters within the cylinder 50. In various embodiments, the internal combustion engine system 20 includes a same number of sensors 32 and/or sensors 55 as a number of cylinders 50. In such embodiments, each cylinder of the plurality of cylinders 50 corresponds to at least one sensor 32 and/or at least one sensor 55. In various embodiments, the controller 36 is configured to receive at least one combustion signal from at least one cylinder 50 within the plurality of cylinders 50 during each combustion cycle. In other embodiments, the controller 36 is configured to receive at least one combustion signal from at least one cylinder 50 within the plurality of cylinders 50 for each interval (i.e., stroke) in each combustion cycle.

In various embodiments, the at least one combustion signal includes at least one pressure measured within the at least one cylinder 50. In some embodiments, the combustion signal includes a comparison between a first measured pressure and a second measured pressure. In some embodiments, the comparison is a ratio or a difference between the first and second measured pressures. In other embodiments, the comparison between the first and second measured pressures can be determined using any other method. In various embodiments, the controller 36 is configured to receive a combustion signal from a first cylinder 50 and a second combustion signal from a second cylinder 50. In other embodiments, the controller 36 can receive a combustion signal corresponding to a measured parameter corresponding to a first cylinder 50 and another measured parameter corresponding to a second cylinder 50. For example, in some embodiments, the controller 36 is configured to receive at least one combustion signal, which corresponds to a first pressure (e.g., in-cylinder pressure) corresponding to a first cylinder 50. In such embodiments, the at least one combustion signal can also correspond to a second pressure (e.g., internal pressure) corresponding to a second cylinder 50. In other embodiments, the controller 36 is configured to receive at least one combustion signal, which corresponds to a first pressure from a first cylinder. The first pressure corresponds to a crank angle in a first interval (or stroke) of a first combustion cycle. The combustion signal further corresponds to a second pressure from the first cylinder. The second pressure corresponds to a crank angle in a second interval (or stroke) of the first combustion cycle.

In some embodiments, the controller 36 is configured to receive at least one combustion signal. The at least one combustion signal corresponds to a first pressure within at least one cylinder 50 when the crankshaft 77 is at a first angle and a second pressure within the at least one cylinder 50 when the crankshaft 77 is at a second angle. For example, in some embodiments, the controller 36 can receive one or more combustion signals including a comparison (e.g., a ratio) between a first pressure within the at least one cylinder 50 when the crankshaft 77 is at the first angle and a second pressure within the at least one cylinder 50 when the crankshaft 77 is at the second angle. In various embodiments, the first angle is approximately-120 degrees. In other embodiments, the second angle is approximately 120 degrees. In yet other embodiments, the controller 36 can receive one or more combustion signals including a comparison (e.g., a ratio) between a first pressure within a first cylinder 50 when the crankshaft 77 is at a first angle, and a second pressure within a second cylinder 50 when the crankshaft 77 is at a second angle. In yet other embodiments, the comparison can be based on at least one averaged pressure within the first cylinder 50 and/or second cylinder 50 that has been averaged over an angle range of the crankshaft 77. For example, in various embodiments, the controller 36 is configured to obtain pressure measurements (i.e., in-cylinder pressure corresponding to the at least one cylinder 50 as measured by the sensors 32 and/or sensors 55) between a first angle and a second angle, and calculate an arithmetic mean (i.e., an average) of the pressure measurements. Using an average instead of individual pressure measurements can suppress noise. In various embodiments, the angle range can be from 120 to 125 degrees. In some embodiments, the first angle can be chosen to correspond to a crank angle immediately following when an intake valve (i.e., of the one or more valves 60) has closed and the second angle can be chosen to correspond to a crank angle immediately preceding when an exhaust valve (i.e., of the one or more valves 60) will open. In other embodiments, the first angle and the second angle can correspond to angles that are equidistant from top dead center (TDC) compression position, where TDC compression occurs when the piston coupled to the crankshaft 77 is at a highest point on a compression stroke. For example, in some embodiments, TDC can be defined as zero degrees, and the first angle can be −120 degrees and the second angle can be 120 degrees. It should be noted that the listed crank angle values provided here are to aid in understanding and, in various embodiments, other crank angles can be used.

In various embodiments, pressure within each cylinder 50 is a function of crank angle. Accordingly, in some embodiments, the controller 36 is configured to receive at least one combustion signal, which corresponds to a first pressure from a first cylinder. The first pressure corresponds to a crank angle within a first interval (or stroke) of a first combustion cycle. Further, the combustion signal can further correspond to, in addition to the first pressure, a second pressure from the first cylinder. The second pressure corresponds to a crank angle within a first interval (or stroke) of a second combustion cycle. In various embodiments, the first interval can precede the second interval. For example, in some embodiments, the first interval is a compression interval, and the second interval is an expansion interval. In some embodiments, the first combustion cycle can precede the second combustion cycle.

In some embodiments, the one or more sensors 32 and/or sensors 55 can be coupled to or be in communication with one or more components in the internal combustion engine 20 in addition to or instead of the plurality of cylinders 50. Accordingly, the one or more sensors 32 and/or sensors 55 can be configured to measure at least one combustion signal associated with the one or more components in the internal combustion engine 20. In some embodiments, the measuring the at least one combustion signal includes measuring a first combustion signal and a second combustion signal respectively corresponding to a first combustion cycle and a second combustion cycle. In various embodiments, measuring the first combustion signal and the second combustion signal includes determining that at least one of the first combustion signal or the second combustion signal corresponds to at least one pressure within at least one of the plurality of cylinders 50. In other embodiments, measuring the first combustion signal and the second combustion signal includes determining that at least one of the first combustion signal or the second combustion signal includes a ratio of pressures between a first pressure and a second pressure. In some embodiments, the at least one cylinder of the plurality of cylinders 50 includes a first cylinder 50 and a second cylinder 50. In various embodiments, the first pressure corresponds to the first cylinder and the second pressure corresponds to the second cylinder. In other embodiments, determining that at least one of the first combustion signal or the second combustion signal corresponds to at least one pressure includes determining that the at least one pressure comprises a third pressure corresponding to a pressure during a first interval within the first combustion cycle and a fourth pressure corresponding to a pressure during a second interval within the first combustion cycle.

In at least one embodiment, the at least one combustion signal can be received by the controller 36 to determine at least one condition associated with the internal combustion engine 20, where the at least one condition corresponds to at least one of engine misfire, delayed combustion, or partial combustion. For example, in some embodiments, the sensors 32 and/or sensors 55 can be coupled to at least one of the valves 60, cylinder head 40, valvetrain 65, manifold 70, ignition system 75, or the output shaft 80. In some embodiments, the sensors 32 and/or the sensors 55 can be configured to measure at least one pressure (e.g., a maximum pressure, or an average pressure) within the manifold 70. For example, in some embodiments, the sensors 32 and/or the sensors 55 can measure at least one pressure within an intake manifold and/or at least one pressure within an exhaust manifold. In other embodiments, the sensors 32 and/or the sensors 55 can measure a speed of the internal combustion engine 20. For example, the sensors 32 and/or the sensors 55 can measure a speed of the internal combustion engine 20 based on a speed of the output shaft 80. Accordingly, in various embodiments, the at least one combustion signal can include a first pressure corresponding to a maximum pressure within at least one cylinder 50 and a second pressure corresponding to a pressure at the intake manifold (i.e., within the at least one manifold 70). For example, in some embodiments, the at least one combustion signal can include a ratio between the maximum pressure of the at least one cylinder 50 and the pressure at the intake manifold.

In various embodiments, the controller 36 is configured to carry out one or more operations based on the at least one combustion signal. As previously described, the at least one combustion signal can correspond to a pressure within at least one cylinder 50. For example, in some embodiments, the sensors 32 and/or the sensors 55 can be included with or operably coupled to an in-cylinder pressure sensor or sensing system (ICPS) and, accordingly, the controller 36 can receive at least one combustion signal from the ICPS of at least one cylinder of the plurality of cylinders 50.

In some embodiments, the at least one combustion signal can include a rate of pressure decay within at least one cylinder 50 versus angle of the crankshaft 77. For example, the at least one combustion signal can include the rate of pressure decay versus angle of the crankshaft 77 (i.e., crank angle) at a first time point prior to when an exhaust valve (within the one or more valves 60) opens and at a second time point after the exhaust valve has opened. In yet other embodiments, the at least one combustion signal can include an amount of heat release rate estimation. For example, the controller 36 can receive one or more heat release estimates from the OEM system 25. In other embodiments, the controller 36 can receive temperature and/or pressure information from one or more components within the internal combustion engine 20 (e.g., the ignition system 75, the engine block 45, the at least one manifold 70, etc.) and determine a heat release estimation therefrom. For example, in some embodiments, the controller 36 can estimate or calculate the heat release from a measured in-cylinder pressure signal. In some embodiments, the in-cylinder pressure signal can be determined as a function of crank angle (i.e., using one or more calculations).

In various embodiments, the at least one combustion signal can include pressures measured within the at least one manifold 70. For example, the at least one combustion signal can include at least one of an intake manifold pressure or an exhaust manifold pressure. In some embodiments, the at least one combustion signal can include a rate of change of the intake manifold pressure and/or a rate of change of the exhaust manifold pressure. In various embodiments, the at least one combustion signal can include engine speed measured within the internal combustion engine 20. For example, the at least one combustion signal can include speed of the output shaft 80. In some embodiments, the at least one combustion signal can include a rate of change or fluctuation of the engine speed. In various embodiments, the rate of change can be determined based on a predetermined interval of time. In other embodiments, the rate of change can be additionally or alternatively determined based on a change between adjacent combustion cycles. In some embodiments, the rate of change can be additionally or alternatively determined based on a change between intervals within a combustion cycle. In yet other embodiments, the rate of change can be additionally or alternatively determined based on a change between when the crankshaft 77 is at a first angle versus when the crankshaft 77 is at a second angle. For example, in some embodiments, the at least one combustion signal received by the controller 36 can include an engine speed excursion (e.g., a change in engine speed) as measured during a compression interval (i.e., when the at least one cylinder 50 is under compression) of at least one combustion cycle and as measured during an expansion interval of at least one combustion cycle.

In other embodiments, the controller 36 can receive a combustion signal including an amount engine speed fluctuation during at least one combustion cycle. The engine speed fluctuation can be measured at an output shaft of the internal combustion engine 20. In some embodiments, the controller 36 can compare the amount of speed fluctuation to at least one of a nominal engine speed fluctuation or a pressure within at least one cylinder 50 during at least one interval of at least one combustion cycle. The controller 36 can, based on the comparison, determine whether the combustion signal is associated with a condition of engine misfire or delayed combustion. The delayed combustion is slow combustion that is slower than combustion occurring at a nominal timing or average timing. In particular, the delayed combustion can be combustion occurring later than a predetermined time or more (a delayed time or lag) from a nominal or average timing of combustion. In various embodiments, delayed combustion can be characterized by a ratio of pressures within at least one cylinder 50 determined at different angles of the crankshaft. In various embodiments, the at least one interval pressure can correspond to at least one of a compression interval or an expansion interval within a combustion cycle. In various embodiments, the heat release rate (HRR) within the internal combustion engine 10 can be indicative of delayed or slow combustion. For example, delayed combustion can be determined (e.g., by the controller 36) based on the crank angle at which 50% of a total heat release has been completed (i.e., CA50). In another example, slow combustion can be determined based on the value of the maximum heat release rate.

As described above, the controller 36 is configured to carry out one or more operations based on the at least one combustion signal. For example, if the at least one combustion signal satisfies one or more thresholds corresponding to a condition associated with the internal combustion engine 20, the controller 36 can proceed to carry out one or more mitigating actions. In some embodiments, the controller 36 is configured to control or adjust a fueling amount to at least one cylinder 50 based on the at least one combustion signal. In some embodiments, the controller 36 is configured to reduce a fueling amount to the at least one cylinder 50 corresponding to the at least one combustion signal. In other embodiments, the controller 36 is configured to additionally or alternatively adjust an amount of fueling to at least one other cylinder 50 that does not correspond to the at least one combustion signal. For example, in some embodiments, the controller 36 can be configured to additionally or alternatively increase or decrease an amount of fueling to at least one other cylinder 50 that does not correspond to the at least one combustion signal. In various embodiments, the controller 36 can be configured to remove all fueling from the at least one cylinder 50 corresponding to the at least one combustion signal. In yet other embodiments, the controller 36 can be configured to delay a spark timing or fuel injection timing to reduce likelihood of knock in a subsequent cycle.

In embodiments where the internal combustion engine 20 is a dual fuel engine, the internal combustion engine 20 can be structured to operate using a first fuel and a second fuel. Accordingly, in these embodiments, the controller 36 can be configured to adjust a fueling amount corresponding to the first fuel and/or the second fuel. For example, in various embodiments, the controller 36 can be configured to reduce a first fueling amount corresponding to the first fuel and increase a second fueling amount corresponding to the second fuel to keep a total fuel energy within the internal combustion engine system 10 approximately constant. In some embodiments, the first fuel is hydrogen and the second fuel is diesel.

The control system 30 can be configured to measure one or more parameters within the internal combustion engine 20 (i.e., via the sensors 32 and/or the sensors 55) during a first combustion cycle and take one or more mitigating actions in one or more subsequent combustion cycles based on the measurement. For example, the controller 36 can be configured to receive one or more combustion signals from one or more cylinders 50 (or from one or more other components within the internal combustion engine) during a first combustion cycle. In such embodiments, the controller 36 can, based on the one or more combustion signals, carry out one or more mitigating actions in at least one subsequent combustion cycle.

The control system 30 can be configured to carry out a plurality of mitigating actions within the internal combustion engine. The control system 30 can be configured to carry out one or more mitigating actions in response to a determination by the controller 36 that a received combustion signal (i.e., one or more measured parameters within the internal combustion engine 20) corresponds to at least one condition associated with the internal combustion engine system 10. For example, in various embodiments, the at least one condition can correspond to engine misfire. In other embodiments, the at least one condition can correspond to delayed combustion. In various embodiments, engine misfire and delayed combustion can be defined based one or more threshold combustion metrics. For example, the threshold combustion metric can be a ratio of cylinder pressures (i.e., of the at least one cylinder 50) at a first angle of the crankshaft 77 and at a second angle of the crankshaft 77. For example, if the ratio of cylinder pressures at the first and second angles of the crankshaft 77 is less than 1.0, the control system 30 (i.e., via the controller 36) can determine the at least one condition is engine misfire. If the ratio of cylinder pressures at the first and second angles of the crankshaft 77 is less than 2.0, the control system 30 can determine that the at least one condition is delayed combustion.

In various embodiments, a threshold combustion metric determinative of engine misfire and/or delayed combustion, such as a pressure ratio threshold, can be determined from a data repository (e.g., database, look-up table, etc.) within the control system 30. In other embodiments, the threshold combustion metric can be determined from experimental data. In yet other embodiments, the threshold combustion metric can be determined or set by the OEM system 25. In other embodiments, the threshold combustion metric can be determined or set by a manufacturer of the internal combustion engine system 10. In various embodiments, the threshold combustion metric is a function of multiple operational parameters of the internal combustion engine 20. For example, the threshold combustion metric can be a function of at least one of an angle of the crankshaft 77, a speed of the internal combustion engine 20, a spark timing within the ignition system 75, an excess air ratio (i.e., Lambda), or an engine load (e.g., load).

In various embodiments, the one or more mitigating actions can include adjusting a fuel delivery amount to at least one of the plurality of cylinders 50. Additionally or alternatively, the controller 36 can be configured to adjust a timing of fuel delivery to the at least one of the plurality of cylinders 50. In other embodiments, the one or more mitigating actions can include adjusting an ignition event within the ignition system 75. For example, the controller 36 can be configured to change a timing or an energy level associated with an ignition event within the ignition system 75. In other embodiments, the controller 36 can adjust a timing or quantity of ignition events within the ignition system 75. For example, if the internal combustion engine 20 is a dual-fuel system or a pilot fuel system, the controller 36 can be configured to adjust ignition timing and/or ignition quantity. In yet other embodiments, the controller 36 can be configured to cause the ignition system 75 to add or increase a number of ignition events and/or pilot fuel injections.

In some embodiments, the one or more mitigating actions can include adjusting an amount of air handling within the internal combustion engine 20. For example, the controller 36 can be configured to change a position of at least one of a wastegate, a compressor bypass, an exhaust gas recirculation valve, an intake throttle, an exhaust throttle, or a variable geometry turbocharger within the internal combustion engine 20. In other embodiments, the one or more mitigating actions can include adjusting at least one valve parameter of at least one of the one or more of the valves 60 within the internal combustion engine. The valve parameter is a parameter relating to an aspect of valve performance, e.g., timing or a physical attribute of a component that influences a property or behavior of the valve. In some embodiments, the valve parameter is an event that influences a property or behavior of the valve. For example, in some embodiments, the controller 36 can change at least one valve parameter that is at least one of a variable valve actuation timing or a camshaft phase angle associated with the one or more valves 60 or a valve lift within the internal combustion engine system 10.

In yet other embodiments, the one or more mitigating actions can include adjusting a water injection amount within the internal combustion engine 20. For example, in some embodiments, the controller 36 can be configured to change at least one of a quantity or timing of water injection into the at least one manifold 70. In other embodiments, the controller 36 can adjust a water injection amount or timing to one or more ports and/or a cylinder of the plurality of cylinders 50.

In various embodiments, the one or more mitigating actions can include adjusting a cooling amount (e.g., via one or more heat exchangers within the internal combustion engine 20). In some embodiments, adjusting a cooling amount includes increasing a flow of coolant through the internal combustion engine 20. In other embodiments, adjusting a cooling amount includes increasing a degree of cooling (i.e., to a threshold above a default threshold). In some embodiments, the one or more mitigating actions can include adjusting a compression ratio associated with the at least one cylinder 50. In various embodiments, adjusting the cooling amount includes regulating a temperature of the charge entering an intake port of at least one cylinder of the plurality of cylinders 50.

As described above, the control system 30 can carry out one or more mitigating actions for a predetermined number of combustion cycles following In various embodiments, the controller 36 is configured to adjust a fueling amount to one or more of the plurality of cylinders 50 (i.e., one or more cylinders corresponding to one or more respective combustion signals and/or one or more other cylinders not corresponding to the one or more combustion signals) for one or more combustion cycles.

During operation of the internal combustion engine system 10, the control system 30 can be configured to measure one or more engine parameters to determine engine misfire and to carry out one or more mitigating actions accordingly.

In various embodiments, the control system 30 includes the at least one sensor 32 (and/or the at least one sensor 55) configured to measure a combustion signal within at least one cylinder 50 of a plurality of cylinders 50 within the internal combustion engine 20. In such embodiments the combustion signal corresponds to a first combustion cycle, and the controller 36. The controller 36 is operably connected to the at least one sensor 32 (and/or the at least one sensor 55). The controller can be configured to receive the combustion signal from the at least one sensor 32 (and/or the at least one sensor 55). The controller 26 can further be configured to determine whether the measured combustion signal satisfies at least one condition associated with the internal combustion engine 20. The at least one condition corresponds to at least one of cylinder 50 misfire or delayed combustion, and based on the determination. In addition, the controller 36 can further be configured to reduce a fueling amount to the at least one cylinder 50 for a predetermined number of combustion cycles following the first combustion cycle.

In various implementations, the internal combustion engine system 10 can be configured to carry out one or more methods for managing and/or mitigating potential effects of engine misfire. In some implementations, a method for controlling the internal combustion engine 20 comprises: measuring, by a sensor 55 of at least one cylinder 50 within the internal combustion engine 20, a first combustion signal and a second combustion signal respectively corresponding to at least one first combustion cycle and at least one second combustion cycle; determining, by a controller 36 in communication with the sensor 55, at least one first condition associated with the at least one cylinder 50 based on at least the first combustion signal and at least one second condition associated with the at least one cylinder 50 based on at least the second combustion signal; responsive to determining one or more of the at least one first condition or the at least one second condition, carrying out at least one mitigating action for the internal combustion engine 20; wherein the at least one mitigating action includes adjusting fuel delivery following the one or more of the at least one first combustion cycle or the at least one second combustion cycle.

Figure 2:
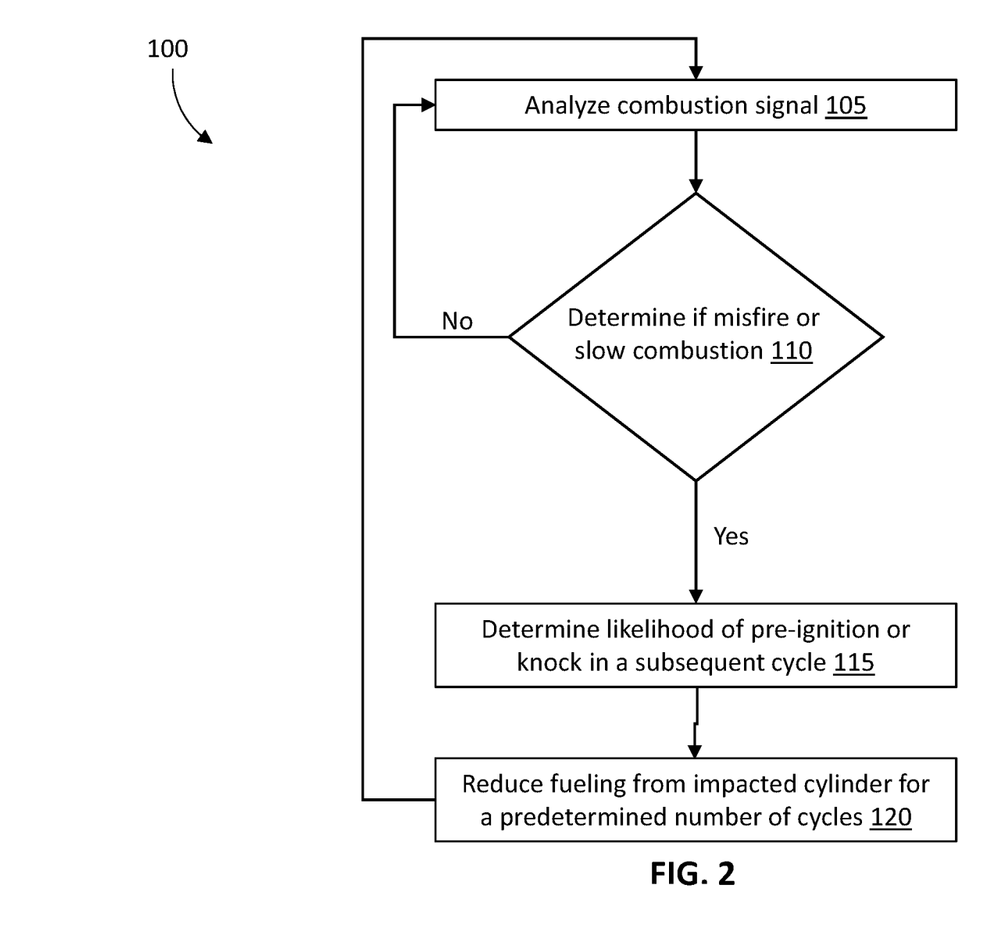
FIG. 2 is a block diagram illustrating an example method of operating the engine system of FIG. 1.

Accordingly, as shown in FIG. 2, the internal combustion engine system 10 can be configured to carry out a method 100 for mitigating potential effects of engine misfire (e.g., pre-ignition or knock). As shown, at least one combustion signal can be received and analyzed by the controller 36 during at least one combustion cycle of the internal combustion engine 20 in an operation 105. As described above, the at least one combustion signal can include at least one measured pressure within at least one cylinder 50. In an operation 110, the controller 36 can determine, based on the at least one combustion signal, whether engine misfire, partial combustion, and/or delayed combustion occurred during the at least one combustion cycle. For example, the controller 36 can compare the at least one combustion signal to one or more thresholds. If the controller 36 determines that the at least one combustion signal is not associated with a condition of engine (or cylinder) misfire, partial combustion, or delayed combustion, the controller 36 can again carry out the operation 105 and analyze a second combustion signal.

If the controller 36 determines that the at least one combustion signal is associated with a condition of engine (or cylinder) misfire, slow combustion, partial combustion, or delayed combustion, the controller 36 can then proceed to an operation 115. The controller 36 can then determine in the operation 115 if, based on the at least one combustion signal, pre-ignition or knock is likely in a subsequent combustion cycle. In the operation 120, the controller 36 can carry out one or more mitigating actions based on the determination that pre-ignition or knock is likely. For example, as shown in FIG. 2, the controller 36 can reduce fueling from at least one cylinder 50 for a predetermined number of combustion cycles (e.g., 0, 1, 2, 3, 5, 9, etc.) The at least one cylinder 50 corresponds to the at least one combustion signal. In various implementations, the controller 36 can reduce fueling to the at least one cylinder 50 by reducing a fueling amount to the at least one cylinder 50. In other embodiments, the controller 50 can reduce fueling to the at least one cylinder 50 by delaying a timing of fueling. As shown in FIG. 2, after reducing fueling to the at least one cylinder 50, the controller 36 can return to the operation 105 and again analyze a subsequent combustion signal. In various implementations, the control system 30 is configured to carry out the operation 100 iteratively throughout operation of the internal combustion engine system 10.

Figure 3:
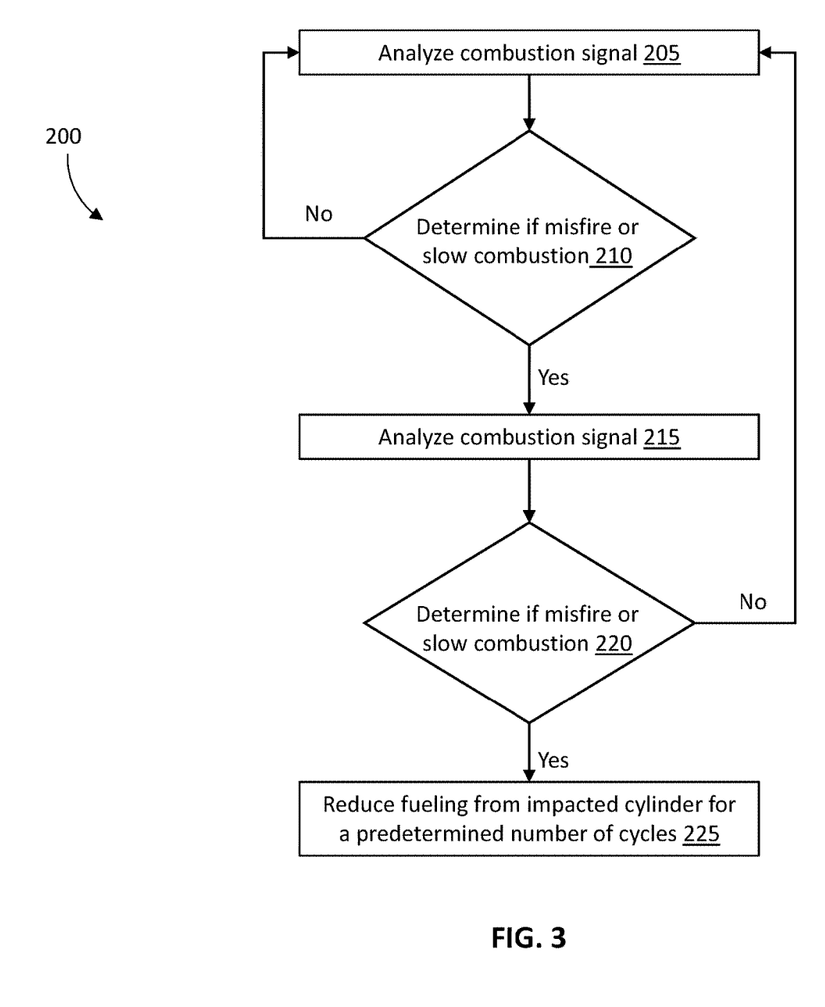
FIG. 3 is a block diagram illustrating another example method of operating the engine system of FIG. 1.

In some embodiments, the control system 30 is configured to analyze multiple combustion signals prior to carrying out a mitigation action, as shown in FIG. 3. As illustrated in FIG. 3, a method 300 of operating the internal combustion engine system 10 includes analyzing, by the controller 36, a first combustion signal associated with a first combustion cycle in an operation 205. In an operation 210, the controller 36 can determine whether the first combustion signal is associated with a condition of engine misfire or delayed combustion. As shown, if the first combustion signal is not associated with a condition of engine misfire or delayed combustion, the controller 36 can again carry out the operation 205 and analyze a subsequent combustion signal. If the first combustion signal is associated with a condition of engine misfire or delayed combustion, the controller 36 can analyze a second combustion signal associated with a second combustion cycle in an operation 215. If the controller 36 determines that the second combustion signal is associated with a condition of engine misfire or delayed combustion, the controller 36 can proceed to carry out one or more mitigating actions. For example, the controller 36 can reduce fueling to one or more cylinders 50.

In various embodiments, the control system 30 can be configured to carry out multiple mitigating actions, or multiple escalating mitigation actions. For example, the control system 30 can be configured to carry out a method that includes measuring, by the sensor 32 (and/or the sensor 55) of at least one cylinder 50 within the internal combustion engine 20, a first combustion signal corresponding to at least one first combustion cycle. The method can further include determining, by the controller 36, which is in communication with the sensor 32 (and/or the sensor 55), at least one first condition associated with the at least one cylinder 50 based on the first combustion signal. The at least one first condition corresponds to a cylinder misfire. The method can then include, responsive to determining the at least one first condition, carrying out at least one mitigating action within the internal combustion engine 20. After the mitigating action, the method can include measuring, by the sensor 32 (and/or the sensor 55), at least one second combustion signal corresponding to at least one second combustion cycle. The method can then include determining, by the controller 36, at least one second condition associated with the at least one cylinder 50 based on the second combustion signal, where the at least one second condition corresponds to at least one of a cylinder misfire or cylinder delayed combustion. Finally, responsive to determining the at least one second condition, the method can include reducing a fueling amount to the at least one cylinder 50 for a predetermined number of combustion cycles following the at least one second combustion cycle.

Figure 4:
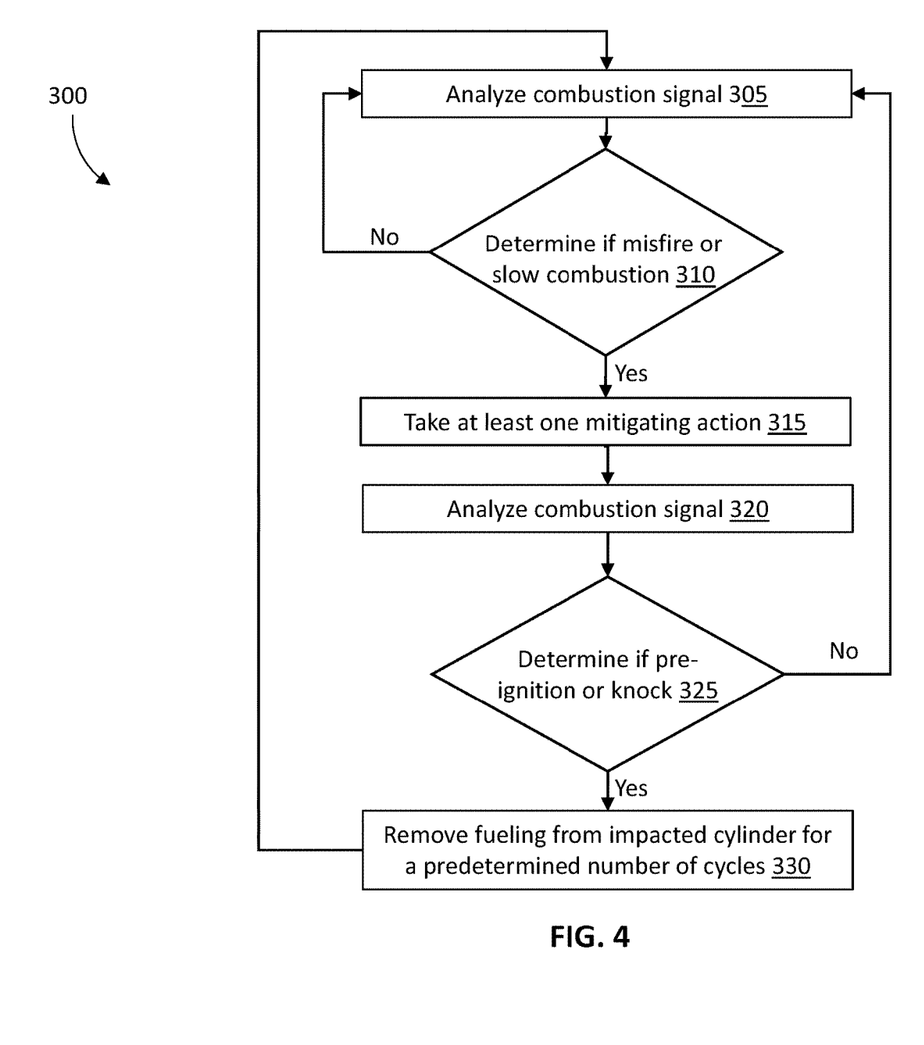
FIG. 4 is a block diagram illustrating another example method of operating the engine system of FIG. 1.

Thus, as shown in FIG. 4, the control system 30 can be configured to carry out a method 300 in which the controller 36 analyzes a first combustion signal during a first combustion cycle in an operation 305. In an operation 310, the controller 36 can then determine if the combustion signal is associated with a condition of engine misfire or delayed combustion. If, in operation 305, the controller 36 determines that the first combustion signal corresponds to or is associated with a condition of engine misfire or delayed combustion, the controller 36 can carry out at least one first mitigating action in an operation 315. In various embodiments, the at least one first mitigating action can include reducing fueling to at least one cylinder 50.

After the controller 36 has carried out the at least one mitigating action, the controller 36 can again receive and analyze a second combustion signal during a second combustion cycle following the first combustion cycle in an operation 320. If the controller 36 determines the second combustion signal is associated with a condition of pre-ignition or knock in an operation 325, the controller 36 can carry out a second mitigating action in an operation 330. In various embodiments, the second mitigating action carried out by the controller 36 can be escalated in comparison to the first mitigating action. For example, as shown in FIG. 4, the second mitigating action can include removing fueling from the at least one cylinder. After the controller 36 has carried out the operation 330, the controller 36 can then return to the operation 305 and again analyze another combustion signal.

Figure 5:
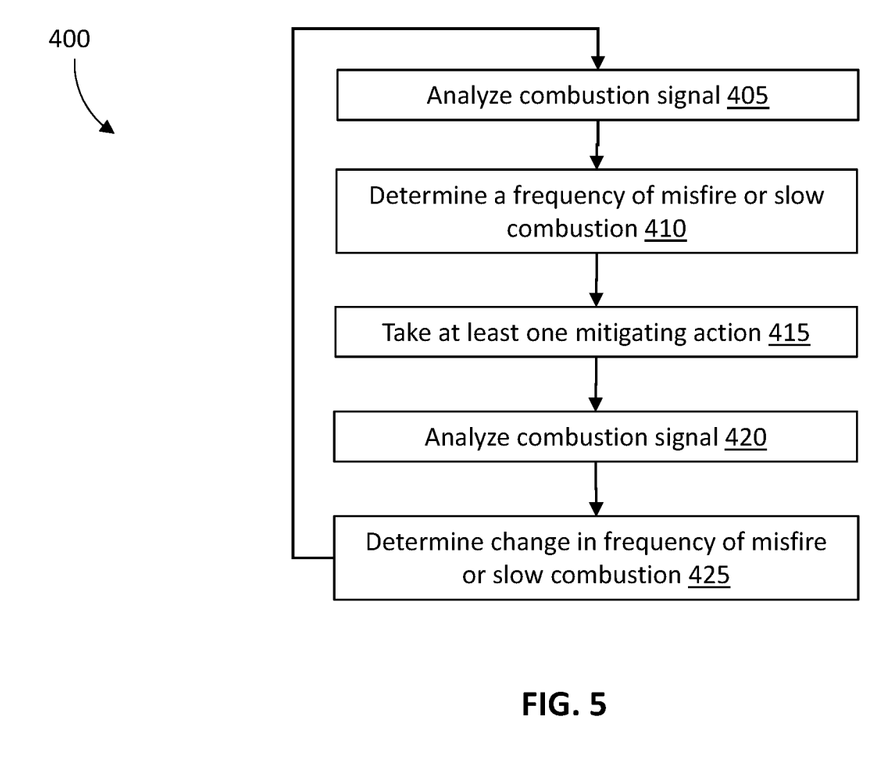
FIG. 5 is a block diagram illustrating another example method of operating the engine system of FIG. 1.

In various embodiments, the control system 30 can be configured to assess a frequency or a rate of change in frequency of conditions associated with engine misfire or delayed combustion and carry out one or more mitigation actions in response. FIG. 5 illustrates a method 400 carried out by the control system 30. As shown in FIG. 5, the controller 36 can be configured to analyze at least one combustion signal in an operation 405. In various embodiments, the at least one combustion signal can include multiple consecutive combustion signals corresponding to multiple consecutive combustion cycles. In various embodiments, the controller 36 can determine whether one or more of the at least one combustion signals are associated with a condition of engine misfire or delayed combustion.

Accordingly, in an operation 410, the controller 30 can be configured to determine a first frequency of combustion signals associated with conditions of engine misfire or delayed combustion, based on the analysis carried out in the operation 405. In various embodiments, the controller 36 can determine a change in frequency (e.g., an increase) of engine misfire or delayed combustion in the operation 410. Based on the determination of the first frequency in the operation 410, the controller 36 can carry out at least one first mitigating action in the operation 415. In various implementations, the at least one first mitigating action can include one or more control operations specific to at least one cylinder 50 (or specific to a combination of cylinders). For example, the controller 36 can adjust at least one of fueling or a compression ratio associated with the at least one cylinder 50 or a combination of cylinders 50.

In an operation 420, the controller 36 can again analyze combustion signals associated with multiple consecutive combustion cycles and determine a second frequency of combustion signals associated with conditions of engine misfire or delayed combustion. The controller 36 can then, compare the first frequency to the second frequency and, based on the comparison, carry out at least one second mitigating action in the operation 425. In various embodiments, the at least one second mitigating action can include increasing ignition or pilot fuel energy. In other embodiments, the at least one second mitigating action can include using a multi-strike ignition feature within the ignition system 75. In yet other embodiments, the at least one second mitigating action can include changing a dual fuel substitution rate within the internal combustion engine 20. In some embodiments, the at least one second mitigating action can include raising an alarm within the internal combustion engine system 10 and/or triggering a shutdown of the internal combustion engine system 10.

Notwithstanding the embodiments described above in reference to FIGS. 1-5 various modifications and inclusions to those embodiments are contemplated and considered within the scope of the present disclosure.

The present technology may also include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A control system for an internal combustion engine, the control system comprising:
  at least one sensor configured to measure a combustion signal within at least one cylinder of a plurality of cylinders within the internal combustion engine, the combustion signal corresponding to a first combustion cycle; and
  a controller operably connected to the at least one sensor, the controller configured to:
    receive the combustion signal from the at least one sensor;
    determine whether the measured combustion signal satisfies at least one condition associated with the internal combustion engine, the at least one condition corresponding to at least one of engine misfire or delayed combustion; and
    based on the determination, reduce a fueling amount to the at least one cylinder for a predetermined number of combustion cycles following the first combustion cycle.

B. The control system of paragraph A, wherein the at least one sensor is a pressure sensor.

C. The control system of paragraph A, wherein the combustion signal includes a ratio of pressures between a first pressure and a second pressure.

D. The control system of paragraph C, wherein the first pressure corresponds to a pressure within a first cylinder of the plurality of cylinders and the second pressure corresponds to a pressure within a second cylinder of the plurality of cylinders.

E. The control system of paragraph C, wherein the first pressure corresponds to a first crank angle in a first interval within the first combustion cycle and the second pressure corresponds to a second crank angle in a second interval within the first combustion cycle; and wherein the first interval is a compression interval and the second interval is an expansion interval.

F. The control system of paragraph C, wherein the first pressure corresponds to a maximum pressure of the at least one cylinder and the second pressure corresponds to a pressure in an intake manifold of the internal combustion engine.

G. The control system of paragraph A, wherein the controller is further configured to adjust a second fueling amount to another cylinder of the plurality of cylinders.

H. The control system of paragraph A, wherein the controller is further configured to adjust a timing of ignition corresponding to the at least one combustion cycle based on the measured combustion signal.

I. The control system of paragraph A, wherein the controller is further configured to adjust a flow of exhaust gas recirculation within the internal combustion engine based on the measured combustion signal.

J. An internal combustion engine system, the internal combustion engine system comprising:
an internal combustion engine comprising:
a plurality of cylinders;
at least one manifold structured to facilitate flow of an intake charge into and out of the plurality of cylinders;
an output shaft, the output shaft being driven by combustion of fuel supplied to each of the plurality of cylinders; and
at least one sensor in communication with each of the plurality of cylinders, the at least one manifold, and the output shaft; and
a control system configured to control the internal combustion engine, the control system comprising at least one controller configured to:
receive at least one combustion signal from the at least one sensor, the at least one combustion signal being associated with at least one of the plurality of cylinders, the output shaft, or the at least one manifold, wherein the at least one combustion signal corresponds to at least one combustion cycle of the internal combustion engine;
determine at least one condition associated with the internal combustion engine;
wherein determining the at least one condition is based on the at least one combustion signal, the combustion signal comprising at least one of the following: at least one pressure within at least one cylinder of the plurality of cylinders, at least one pressure within the at least one manifold, or a rotational speed of the output shaft; and
based on the determination, reduce a fueling amount to the at least one cylinder of the plurality of cylinders for a predetermined number of combustion cycles following the at least one combustion cycle.

K. The internal combustion engine system of paragraph J, wherein the at least one combustion signal comprises the rotational speed of the output shaft and wherein the at least one controller is further configured to:
determine an amount of fluctuation in the rotational speed of the output shaft; and
compare the amount of fluctuation in the rotational speed to a nominal speed fluctuation amount; and
wherein determining the at least one condition is further based on the comparison between the amount of fluctuation in the speed and the nominal speed fluctuation amount.

L. The internal combustion engine system of paragraph J, wherein the at least one combustion signal comprises the at least one pressure within the at least one manifold and wherein the at least one controller is configured to:
determine a rate of change of the at least one pressure within the at least one manifold, the at least one manifold comprising at least one of an intake manifold or an exhaust manifold; and
wherein determining the at least one condition is further based on the rate of change of the at least one pressure within the at least one manifold.

M. The internal combustion engine of paragraph J, wherein the at least one combustion signal includes a first pressure within the at least one cylinder of the plurality of cylinders and a second pressure within the at least one cylinder of the plurality of cylinders.

N. The internal combustion engine of paragraph M, wherein the first pressure corresponds to a first angle of a crankshaft within the internal combustion engine and the second pressure corresponds to a second angle of the crankshaft within the internal combustion engine.

O. The internal combustion engine of paragraph J, wherein the at least one combustion cycle comprises a first combustion cycle and a second combustion cycle subsequent to the first combustion cycle, and wherein the at least one combustion signal comprises a first combustion signal corresponding to the first combustion cycle and a second combustion signal corresponding to the second combustion signal.

P. A method for controlling an internal combustion engine, the method comprising:
measuring, by a sensor of at least one cylinder within the internal combustion engine, a first combustion signal and a second combustion signal respectively corresponding to at least one first combustion cycle and at least one second combustion cycle;
determining, by a controller in communication with the sensor, at least one first condition associated with the at least one cylinder based on at least the first combustion signal and at least one second condition associated with the at least one cylinder based on at least the second combustion signal;
responsive to determining one or more of the at least one first condition or the at least one second condition, carrying out at least one mitigating action for the internal combustion engine;
wherein the at least one mitigating action includes adjusting fuel delivery following the one or more of the at least one first combustion cycle or the at least one second combustion cycle.

Q. The method of paragraph P, wherein carrying out the at least one mitigating action comprises at least one of the following:
adjusting a fuel delivery amount to the at least one cylinder;
adjusting an ignition event within at least one cycle subsequent to the at least one combustion cycle;
adjusting an amount of air handling within the internal combustion engine;
adjusting at least one valve parameter corresponding to at least one valve within the internal combustion engine;
adjusting a water injection amount within the internal combustion engine;
adjusting a cooling amount within the internal combustion engine; or
adjusting a compression ratio associated with the at least one cylinder.

R. The method of paragraph P, wherein measuring the first combustion signal and the second combustion signal comprises determining that at least one of the first combustion signal or the second combustion signal corresponds to at least one pressure within the at least one cylinder.

S. The method of paragraph P, wherein measuring the first combustion signal and the second combustion signal comprises determining that at least one of the first combustion signal or the second combustion signal comprises a ratio of pressures between a first pressure and a second pressure, and wherein the at least one cylinder comprises a first cylinder and a second cylinder, the first pressure corresponding to the first cylinder and the second pressure corresponding to the second cylinder.

T. The method of paragraph R, wherein determining that at least one of the first combustion signal or the second combustion signal corresponds to at least one pressure comprises determining that the at least one pressure comprises a third pressure corresponding to a pressure during a first interval within the first combustion cycle and a fourth pressure corresponding to a pressure during a second interval within the first combustion cycle.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that can result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the terms "exemplary," "example" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References herein to the positions of elements (e.g., "top," "bottom," "above," "below") are merely used to describe the orientation of various elements in the FIGURES. It should be noted that the orientation of various elements can differ according to other example embodiments, and that such variations are intended to be encompassed by the present disclosure.

Although the figures and description can illustrate a specific order of method steps, the order of such steps can differ from what is depicted and described, unless specified differently above. Also, two or more steps can be performed concurrently or with partial concurrence, unless specified differently above.

It is important to note that any element disclosed in one embodiment can be incorporated or utilized with any other embodiment disclosed herein. Although only one example of an element from one embodiment that can be incorporated or utilized in another embodiment has been described above, it should be appreciated that other elements of the various embodiments can be incorporated or utilized with any of the other embodiments disclosed herein.

What is claimed is:

1. A control system for an internal combustion engine, the control system comprising:
    at least one sensor configured to measure a combustion signal within at least one cylinder of a plurality of cylinders within the internal combustion engine, the combustion signal corresponding to a first combustion cycle of a plurality of consecutive combustion cycles; and
    a controller operably connected to the at least one sensor, the controller configured to:
        receive the combustion signal from the at least one sensor;
        determine whether the measured combustion signal satisfies at least one condition associated with the internal combustion engine, the at least one condition corresponding to at least one of engine misfire or delayed combustion; and
        based on the determination, reduce a fueling amount to the at least one cylinder for a predetermined number of combustion cycles of the plurality of consecutive combustion cycles the predetermined number of combustion cycles following the first combustion cycle.

2. The control system of claim 1, wherein the at least one sensor is a pressure sensor.

3. The control system of claim 1, wherein the combustion signal includes a ratio of pressures between a first pressure and a second pressure.

4. The control system of claim 3, wherein the first pressure corresponds to a pressure within a first cylinder of the plurality of cylinders and the second pressure corresponds to a pressure within a second cylinder of the plurality of cylinders.

5. The control system of claim 3, wherein the first pressure corresponds to a first crank angle in a first interval within the first combustion cycle and the second pressure corresponds to a second crank angle in a second interval within the first combustion cycle; and
    wherein the first interval is a compression interval and the second interval is an expansion interval.

6. The control system of claim 3, wherein the first pressure corresponds to a maximum pressure of the at least one cylinder and the second pressure corresponds to a pressure in an intake manifold of the internal combustion engine.

7. The control system of claim 1, wherein the controller is further configured to adjust a second fueling amount to another cylinder of the plurality of cylinders.

8. The control system of claim 1, wherein the controller is further configured to adjust a timing of ignition corresponding to the at least one combustion cycle based on the measured combustion signal.

9. The control system of claim 1, wherein the controller is further configured to adjust a flow of exhaust gas recirculation within the internal combustion engine based on the measured combustion signal.

* * * * *